(12) United States Patent
Sako et al.

(10) Patent No.: US 7,449,627 B2
(45) Date of Patent: Nov. 11, 2008

(54) APPARATUS AND METHOD FOR REPRODUCING AUDIO SIGNAL

(75) Inventors: Yoichiro Sako, Tokyo (JP); Akane Sano, Tokyo (JP); Akihiro Komori, Tokyo (JP); Takatoshi Nakamura, Kanagawa (JP); Kenichi Makino, Kanagawa (JP); Motoyuki Takai, Tokyo (JP); Katsuya Shirai, Kanagawa (JP); Makoto Inoue, Tokyo (JP); Hirofumi Tamori, Tokyo (JP); Toshiro Terauchi, Tokyo (JP); Yuichi Sakai, Kanagawa (JP); Toru Sasaki, Tokyo (JP); Susumu Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 11/633,215

(22) Filed: Dec. 4, 2006

(65) Prior Publication Data

US 2007/0157798 A1   Jul. 12, 2007

(30) Foreign Application Priority Data

Dec. 6, 2005   (JP) .............................. 2005-351581

(51) Int. Cl.
*G10H 7/00* (2006.01)

(52) U.S. Cl. ...................................................... 84/612

(58) Field of Classification Search .................. 84/612; 482/3–9, 900, 901; 700/94
See application file for complete search history.

(56) References Cited

U.S. PATENT DOCUMENTS

| | | |
|---|---|---|
| 2003/0060728 A1 | 3/2003 | Mandigo |
| 2005/0249080 A1 | 11/2005 | Foote |
| 2006/0107822 A1* | 5/2006 | Bowen ........................ 84/612 |
| 2006/0243120 A1* | 11/2006 | Takai et al. ................... 84/612 |

FOREIGN PATENT DOCUMENTS

| | | |
|---|---|---|
| EP | 1533784 A | 5/2005 |
| JP | 2005-156641 A | 6/2005 |
| WO | WO 2004/072767 | 8/2004 |

* cited by examiner

*Primary Examiner*—Jeffrey Donels
(74) *Attorney, Agent, or Firm*—Wolf, Greenfield & Sacks, P.C.

(57) ABSTRACT

An audio signal reproducing apparatus includes a storage unit for storing digital audio data of music pieces each having a tempo corresponding to either a first tempo or a second tempo, the second tempo being different from the first tempo, if a walking tempo of a user is either the first tempo or the second tempo, a reproducing circuit for reproducing the digital audio data, a detecting unit for detecting the walking tempos of the user, a calculating circuit for calculating a change in the walking tempo detected by the detecting unit, and a control circuit for retrieving the digital audio data from the storage unit in accordance with the walking tempo detected by the detecting unit and sending the retrieved digital audio data to the reproducing circuit.

16 Claims, 7 Drawing Sheets

APPARATUS AND METHOD FOR REPRODUCING AUDIO SIGNAL

CROSS REFERENCES TO RELATED APPLICATIONS

The present invention contains subject matter related to Japanese Patent Application JP 2005-351581 filed in the Japanese Patent Office on Dec. 6, 2005, the entire contents of which are incorporated herein by reference.

BACKGROUND OF THE INVENTION

1. Field of the Invention

The present invention relates to apparatus and methods for reproducing audio signals.

2. Description of the Related Art

Recently, with growing interest in health issues, there have been more and more people who go walking, jogging, or running (hereinafter collectively referred to as "walking") for the purpose of health maintenance, health promotion, weight reduction, etc. Walking brings about a beneficial effect when a person walks continuously for a sufficient period of time.

To achieve such an effect of walking, several techniques have been developed. For example, a portable audio reproducing device is known in which a walking tempo of a user (walker) is detected, and a music piece having a tempo corresponding to the walking tempo is reproduced as the walker listens to the music piece while walking. Note that a walking tempo refers to the number of steps per unit time (for example, one minute), and a music tempo refers to the number of beats per minute.

Referring to diagrams I to III shown in FIG. 7, a relationship between a walking tempo of a user and a music tempo of a music piece to be reproduced in such an audio reproducing device mentioned above is illustrated. The diagram I in FIG. 7 illustrates the walking tempo of the user. In a period T1, the user walks at a tempo VA that is normal to the user (normal speed). In a period T2, the user walks at a tempo VB that is slower than the tempo VA in the period T1, and then walks at the tempo VA again in a period T3.

In this case, as illustrated in diagrams II and III in FIG. 7, the audio reproducing device reproduces a music piece A1 of the tempo VA that is equal to the walking tempo VA during the period T1. During the period T2, the device reproduces a music piece B1 of the tempo VB that is equal to the walking tempo VB, and then reproduces a music piece A2 of the tempo VA again that is equal to the walking tempo VA during the period T3.

When the walking tempo of the user matches the tempo of a music piece, as described above, the user can walk with a rhythm. Thus, the audio reproducing apparatus allows the user to continue walking enjoyably.

An example of such a technique described above is disclosed in Japanese Unexamined Patent Application Publication No. 2005-156641.

However, if the a music piece having a music tempo suddenly changes into another music piece having a different music tempo in response to a change in the walking tempo of the user, as illustrated in FIGS. 7B and 7C, the user may feel discomfort at the other music piece and its tempo.

SUMMARY OF THE INVENTION

The present invention has been made in view of the above circumstance.

Accordingly, an audio signal reproducing apparatus according to an embodiment of the present invention includes a storage unit for storing digital audio data of music pieces each having a tempo corresponding to either a first tempo or a second tempo, the second tempo being different from the first tempo, if a walking (including running, hereinafter the same) tempo of a user is either the first tempo or the second tempo at any given time, a reproducing circuit for reproducing the digital audio data, a detecting unit for detecting the walking tempos of the user, a calculating circuit for calculating a change in the walking tempo detected by the detecting unit, and a control circuit for retrieving the digital audio data from the storage unit in accordance with the walking tempo detected by the detecting unit and sending the retrieved digital audio data to the reproducing circuit. In this audio signal reproducing apparatus, when the walking tempo is the first tempo or the second tempo, the control circuit retrieves the digital audio data of the music piece whose tempo corresponds to the first tempo or the second tempo, respectively, and sends the retrieved digital audio data to the reproducing circuit. When the walking tempo of the user changes from the first tempo to the second tempo and the change exceeds a predetermined threshold value, the control circuit changes the digital audio data to be sent from the storage unit to the reproducing circuit, after a predetermined time period has elapsed since the change of the walking tempo, from the digital audio data of a music piece whose tempo corresponds to the first tempo to the digital audio data of a music piece whose tempo corresponds to the second tempo. In addition, when the walking tempo of the user changes from the second tempo to the first tempo and the change exceeds a predetermined threshold value, the control circuit changes the digital audio data to be sent from the storage unit to the reproducing circuit, at the time point when the change of the walking tempo occurs, from the digital audio data of a music piece whose tempo corresponds to the second tempo to the digital audio data of a music piece whose tempo corresponds to the first tempo.

According to an embodiment of the present invention, a music piece having a tempo corresponding to the walking tempo of a user is reproduced. In addition, when the walking tempo of the user is shifted from the first tempo to another tempo (for example, the second tempo that is slower than the first tempo), the music piece and its tempo are changed with a delay of a predetermined time period.

This prevents the user from feeling discomfort at the subsequent music piece and its tempo.

In addition, the walking temp of the user is shifted from the second tempo to the first tempo, the music piece to be reproduced and its tempo are changed immediately. This allows the user to walk at an appropriate tempo without disturbance.

DESCRIPTION OF THE PREFERRED EMBODIMENTS

[1] Circuit Configuration

Figure 1:
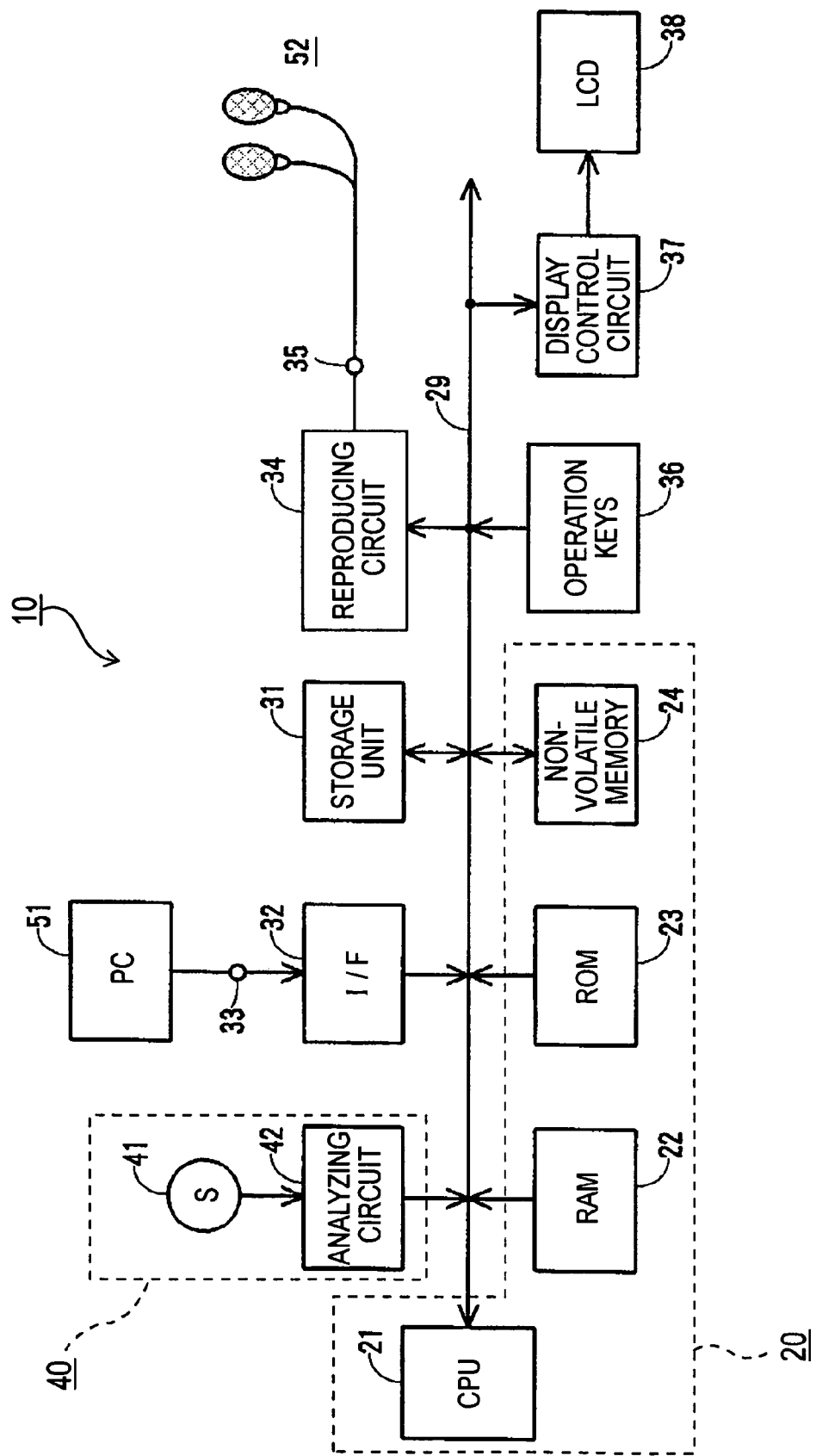
FIG. 1 is a system diagram illustrating an embodiment of the present invention.

FIG. 1 illustrates an example of a configuration of a circuit of a reproducing apparatus 10 for reproducing an audio signal, according to an embodiment of the present invention. The reproducing apparatus 10 can be used as a walking aid device as well as a general portable player. Thus, the reproducing apparatus 10 has a size and a shape (not shown) that allow the user to carry the reproducing apparatus 10 in his or her pocket or the like while walking.

The reproducing apparatus 10 includes a microcomputer 20 as a system control circuit. The microcomputer 20 has a CPU (Central Processing Unit) 21 for executing a program, a ROM (Read-only Memory) 22 having various programs recorded therein, a RAM (Random Access Memory) 23 used as a work area, and a non-volatile memory 24. Each of these memories 22 to 24 is connected to the CPU 21 via a system bus 29. In this case, the non-volatile memory 24 can be a flash memory, for example, and serves to store various information on the reproducing apparatus 10 and a user. The programs recorded in the ROM 22 will be described below.

The reproducing apparatus 10 further includes a storage unit 31. The storage unit 31 serves to store various music data (digital music data) to be reproduced as music pieces. Thus, the storage unit 31 can be a large-capacity flash memory or a small hard disk unit.

The storage unit 31 is connected to the system bus 29. The system bus 29 is connected to an interface circuit 32 so that music data is loaded from an external personal computer 51 to the microcomputer 20 through an input connector 33 and the interface circuit 32 and then stored in the storage unit 31. The music data to be stored in the storage unit 31 can be digital audio data which has been compressed into a MP3 (MPEG (Motion Picture Experts Group)-1/Audio Layer 3) format or the like.

The reproducing apparatus 10 also includes a reproducing circuit 34, which is connected to the system bus 29. The reproducing circuit 34 has a decoder for expanding the compressed music data into digital audio data, a digital to analog (D/A) converter for converting the digital audio data into an analog audio signal, and an output amplifier. When the music data is fetched from the storage unit 31, the music data is expanded and converted into an analog audio signal. The analog audio signal is output to a headphone jack 35 to which a headphone 52 is connected.

Various operation keys 36 are connected to a system bus 29. In addition, a display device, for example, an LCD (Liquid Crystal Display) 38 is connected to the system bus 29 through a display control circuit 37. In this case, the operation keys 36 serves to allow a user to select whether the reproducing apparatus 10 is applied as a portable player or as a walking aid device, to select an operation mode in each of the applications, to select a music piece, and to perform various setting operations. The LCD 38 serves to display a result of an operation of the operation keys 36 and information on a music piece being played.

The reproducing apparatus 10 also includes a detecting unit 40 for detecting a walking tempo of a user walking carrying the reproducing apparatus 10. The detecting unit 40 is constituted by a three-dimensional acceleration sensor 41 and an analyzing circuit 42 for analyzing an output of the three-dimensional acceleration sensor 41. The three-dimensional acceleration sensor 41 detects body movement of the user. Then the analyzing circuit 42 analyzes a result of the detection and outputs a pulse at a tempo synchronized with walking of the user. The output of the detection of the walking tempo is loaded to the microcomputer 20 through the system bus 29.

[2] Operation

[2-1] Storage of Music Data

Music data of music pieces desired to be stored in the reproducing apparatus 10 is compressed and prepared in the personal computer 51. Then, the personal computer 51 is connected to the connector 33, and a predetermined transfer program is executed in the personal computer 51 so that transfer of the music data is instructed. Subsequently, the music data prepared in the personal computer 51 is fed to the reproducing apparatus 10 through the connector 33. The music data is loaded to the CPU 21 through the interface circuit 32 and stored in the storage unit 31.

At this time, the CPU 21 executes a predetermined program such that a tempo of the stored music data is analyzed and registered in one of playlists provided on the basis of categories of music tempos.

Figure 2:
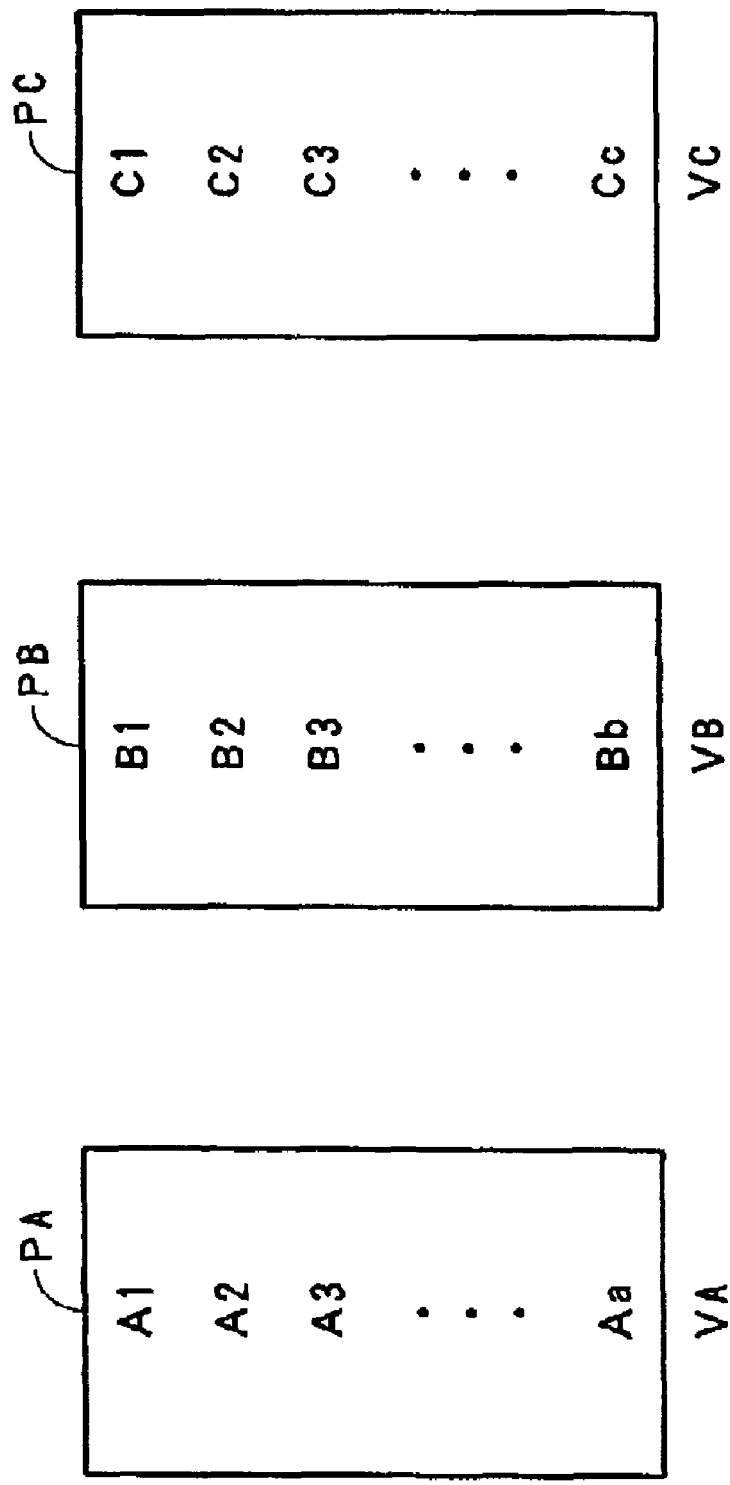
FIG. 2 illustrates an example of contents registered in playlists.

Referring to FIG. 2, examples of such playlists and contents registered therein are shown. The walking tempo (walking speed) of a user is categorized into three types: VA (a normal tempo), VB (a tempo slower than VA), and VC (a tempo other than VA and VB). Three playlists PA to PC are provided that correspond to the three types of tempos.

For example, if the tempo of a music piece is within a range of ±10 percent of the normal tempo VA, the music piece is registered in the playlist PA. If the tempo of another music piece is within a range of, for example, ±10 percent of the tempo VB, the music piece is registered in the playlist PB. A music piece whose tempo corresponds to neither the playlist PA nor the playlist PB is registered in the playlist PC.

In the example shown in FIG. 2, music titles A1 to Aa of music pieces whose tempos are within ±10 percent of the tempo VA are registered in the playlist PA. Music titles B1 to Bb of music pieces whose tempos are within ±10 percent of the tempo VB are registered in the playlist PB. Music titles C1 to Cc of music pieces whose tempos are neither within ±10 percent of VA nor VB are registered in the playlist PC. These playlists PA to PC are stored in the non-volatile memory 24, for example.

[2-2] Reproducing Music as Portable Player

When the reproducing apparatus 10 is used as a general portable player, an operation mode that enables a function of the portable player is selected using the operation keys 36. When a play key among the operation keys 36 is depressed, music data stored in the storage unit 31 is read out. The read music data is fed to the reproducing circuit 34 so as to undergo data expansion and D/A conversion.

Thus, an analog audio signal corresponding to the read music data is output from the reproducing circuit 34. This analog audio signal is supplied to the headphone 52 so that a user can listen to the music piece corresponding to the music data through the headphone 52. At this time, the title of the music piece being reproduced is displayed on the LCD 38.

The music data is read out from the storage unit 31 in accordance with a reproducing mode which has been set in advance, such that reproduction of a single music piece, or sequential or random reproduction of music pieces is executed. In such a manner as described above, the reproducing apparatus 10 can be used as a general portable player.

[2-3] Reproducing Music as Walking Aid Apparatus (Part 1)

When the reproducing apparatus 10 is used as a walking aid apparatus, an operation mode that enables a function of the walking aid apparatus is selected using the operation keys 36. In this case, music pieces to be reproduced and the tempos of the music pieces are controlled in accordance with the walking tempo of a user as illustrated in diagrams I to IV shown in FIG. 3.

Figure 3:
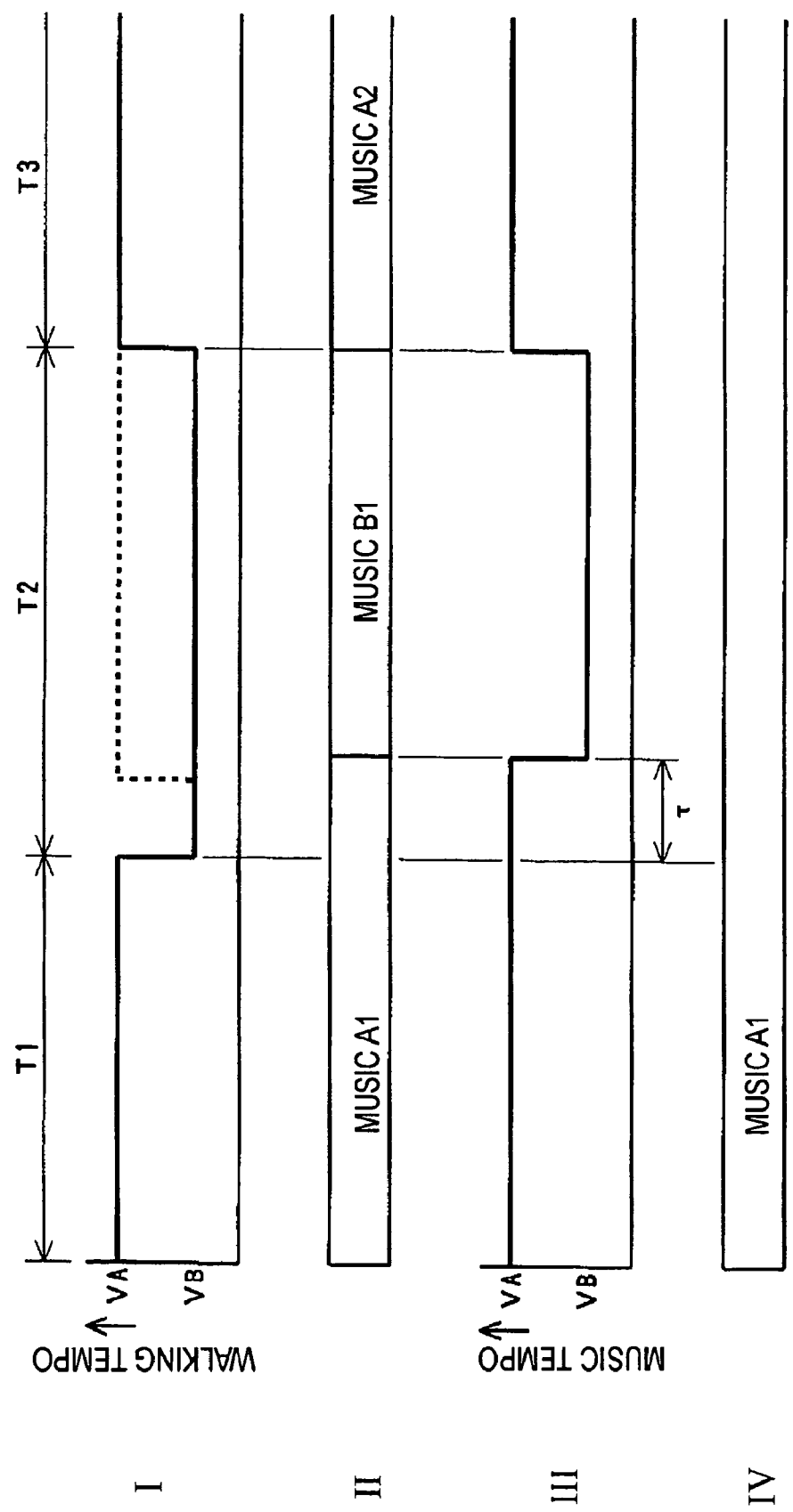
FIG. 3 illustrates an operation according to an embodiment of the present invention.

The diagram I in FIG. 3 illustrates walking tempos of the user. During a period T1, the user walks at the normal tempo VA. Thus, the playlist PA corresponding to the tempo VA is selected in accordance with a detection output of the detecting unit 40. At the same time, one of the music titles A1 to Aa that have been registered in the playlist PA (for example, A1 in this case) is selected.

Then, the music data corresponding to the music title A1 is read from the storage unit 31 and fed to the reproducing circuit 34. Accordingly, during the period T1, the user is to listen to the music piece of the selected music title A1 through the headphone 52, as illustrated in the diagram II and III in FIG. 3.

Specifically, as can be seen from FIG. 3, when the user is walking at the normal walking tempo VA, the music piece (title: A1, for example) of the normal tempo VA is reproduced. Thus, while walking, the user is to listen to the music piece (title: A1) of the normal tempo VA that is similar to the current walking tempo VA of the user.

When the music piece (title: A1, for example) ends during the period T1, another music title is selected from the playlist PA. The music data corresponding to the music title is read from the storage unit 31 so as to be reproduced. With this arrangement, music pieces having normal tempos are continuously reproduced during the period T1.

Then the walking tempo of the user slows down to the tempo VB in a period T2 subsequent to the period T1. Even in this case, the music piece (title: A1), which has been performed in the period T1, is continued to be reproduced for a predetermined period t starting at the beginning of the period T2 (for example, t=15 seconds).

However, when the period t has elapsed since the beginning of the period T2, the playlist PB corresponding to the tempo VB is selected and the music title B1, for example, registered in the playlist PB is selected. Then, the music data corresponding to the music title B1 is read from the storage unit 31 and fed to the reproducing circuit 34.

As can be seen from FIG. 3, from the time when the period t has elapsed, the music piece (title: B1) corresponding to the walking tempo VB of the user is subsequently reproduced. That is, even when the user reduces his or her walking tempo, the music piece and the music tempo are not changed immediately. Instead, a music piece of a slower tempo, which corresponds to the slower walking tempo in the period T2, starts being reproduced when the period t has elapsed.

When the user's walking tempo becomes the normal tempo VA again in a period T3 subsequent to the period T2, the playlist PA corresponding to the tempo VA is selected. At the same time, the music title A2, for example, registered in the playlist PA is selected. Then, the music data corresponding to the music title A2 is read from the storage unit 31 and fed to the reproducing circuit 34.

Thus, as can be seen from FIG. 3, at the beginning of the period T3, the music piece (title: A2), which corresponds to the walking tempo VA, starts being reproduced. That is, when the user walks at the normal tempo VA again, a music piece of the tempo VA immediately starts being reproduced.

As illustrated by a broken line in the diagram I in FIG. 3, in a case where the user changes his or her walking tempo from the slow tempo VB to the normal tempo VA during the period t, the music piece (title: A1), which has been reproduced in the period T1 and period t, is continued to be reproduced, as shown in the diagram IV in FIG. 3.

As described above, the reproducing apparatus 10 reproduces a music piece corresponding to a walking tempo of a user. In addition, when the walking tempo of the user changes from the normal tempo VA to the slow tempo VB, such as at the beginning of the period T2 illustrated in FIG. 3, the music piece and the music tempo are changed with a delay of the predetermined period t. This arrangement prevents the user from feeling discomfort at the subsequent music piece and its tempo after the change.

In addition, when the walking tempo of the user is changed from the slow tempo VB to the normal tempo VA, such as at the beginning of the period T3, the music piece and the music tempo are immediately changed. This arrangement prevents a music piece to be reproduced from hindering walking of the user, and thus allows the user to walk appropriately at his or her normal tempo.

[2-4] Reproducing Music as Walking Aid Apparatus (Part 2)

In the following, a case where a playlist PD is added to the playlists PA to PC will be described. In this playlist PD, music titles D1 to Dd of music pieces whose tempos are slower than the normal tempo VA and faster than the tempo VB (intermediate tempo VD) are registered. For example, if the tempo of a music piece is within a range of ±10 percent of a walking tempo of a user corresponding to the tempo VD, the music piece is registered in the playlist PD.

Figure 4:
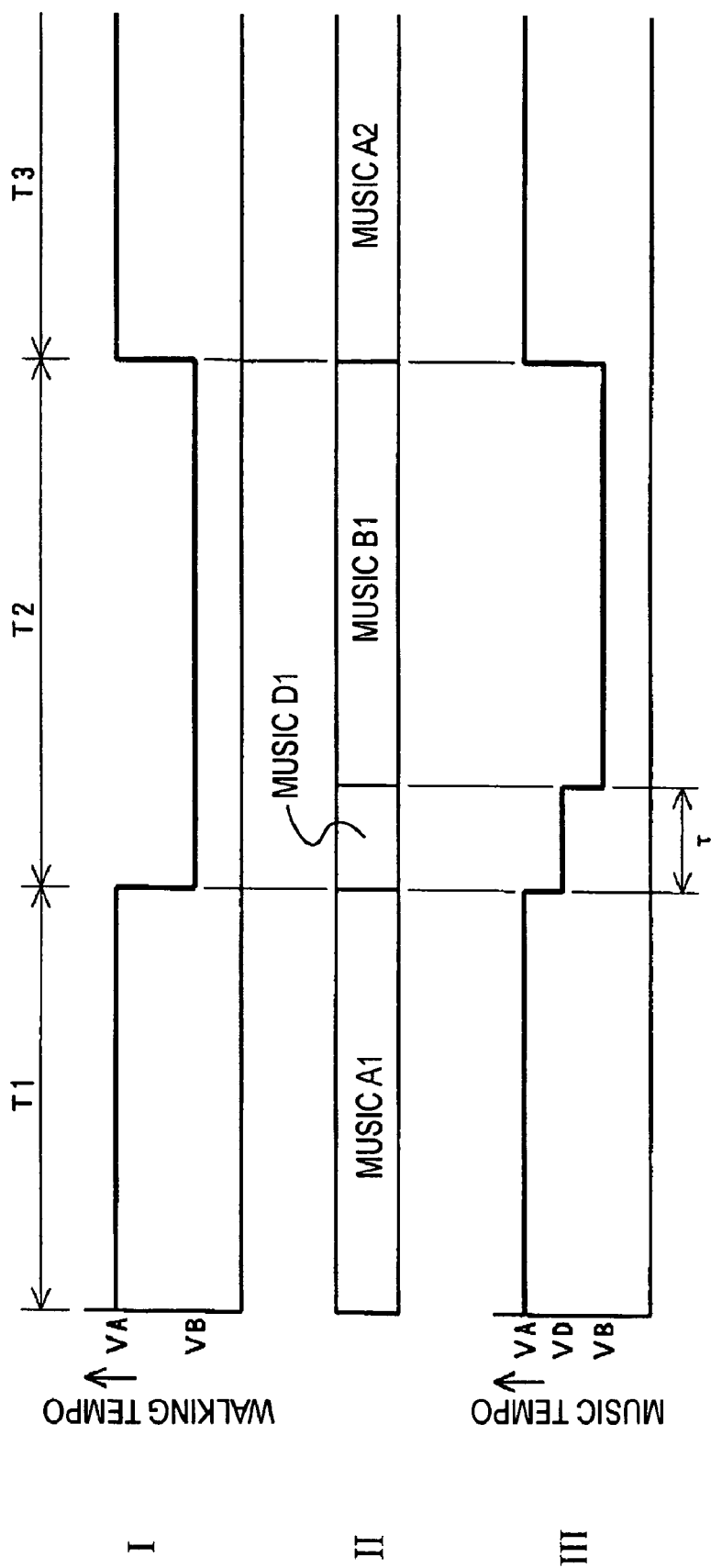
FIG. 4 illustrates an operation according to an embodiment of the present invention.

In this case, when the walking tempo of the user is changed from the normal tempo VA to the slow tempo VB, the music piece to be reproduced and the music tempo are controlled in accordance with the walking tempo, as illustrated in FIG. 4.

Specifically, as illustrated in the figure, the user is walking at the tempo VA in the period T1, similarly to the case illustrated using FIG. 3, and the music piece [title: A1, for example] of the tempo VA is reproduced.

However, when the walking tempo of the user slows down to the tempo VB in the period T2 subsequent to the period T1, the playlist PD is selected and the music title D1 registered in the playlist PD is selected in the predetermined period t starting at the beginning of the period T2. Then, music data corresponding to the selected music title D1 is read from the storage unit 31 and fed to the reproducing circuit 34. Thus, during the period t, the user is to listen to a music piece whose tempo is intermediate between the normal tempo VA and the slow tempo VB.

When the period t has elapsed, the playlist PB corresponding to the tempo VB is selected for the period T2. At the same time, the music title B1, for example, registered in the selected playlist PB is selected. Then, the music data corresponding to the music title B1 is read from the storage unit 31 and fed to the reproducing circuit 34.

Accordingly, as illustrated in FIG. 4, from time point when the period has elapsed since the beginning of the period T2, a music piece (title: B1, for example) corresponding to the current walking tempo VB starts being reproduced. That is, even when the user reduces his or her walking tempo, the music piece and the music tempo are not changed immediately. Instead, after the period t has elapsed, a music piece of a slow tempo corresponding to the walking tempo is reproduced.

When the walking tempo of the user returns to the normal tempo VB in the period T3 subsequent to the period T2, a music piece (title: A2, for example) whose tempo corresponds to the walking tempo VA start being reproduced, similarly to the case illustrated using FIG. 3. That is, when the user changed his or her walking tempo back to the normal tempo VA, a music piece corresponding to the tempo VA immediately starts being reproduced.

As described above using FIG. 4, when the walking tempo of the user changes from the tempo VA to the tempo VB, the music piece whose tempo is intermediate between the tempo VA to the tempo VB is subsequently reproduced. This prevents the user from feeling discomfort at the subsequent music piece and music tempo after the change.

[3-1] Example of Processing Routine (Part 1)

Figure 5:
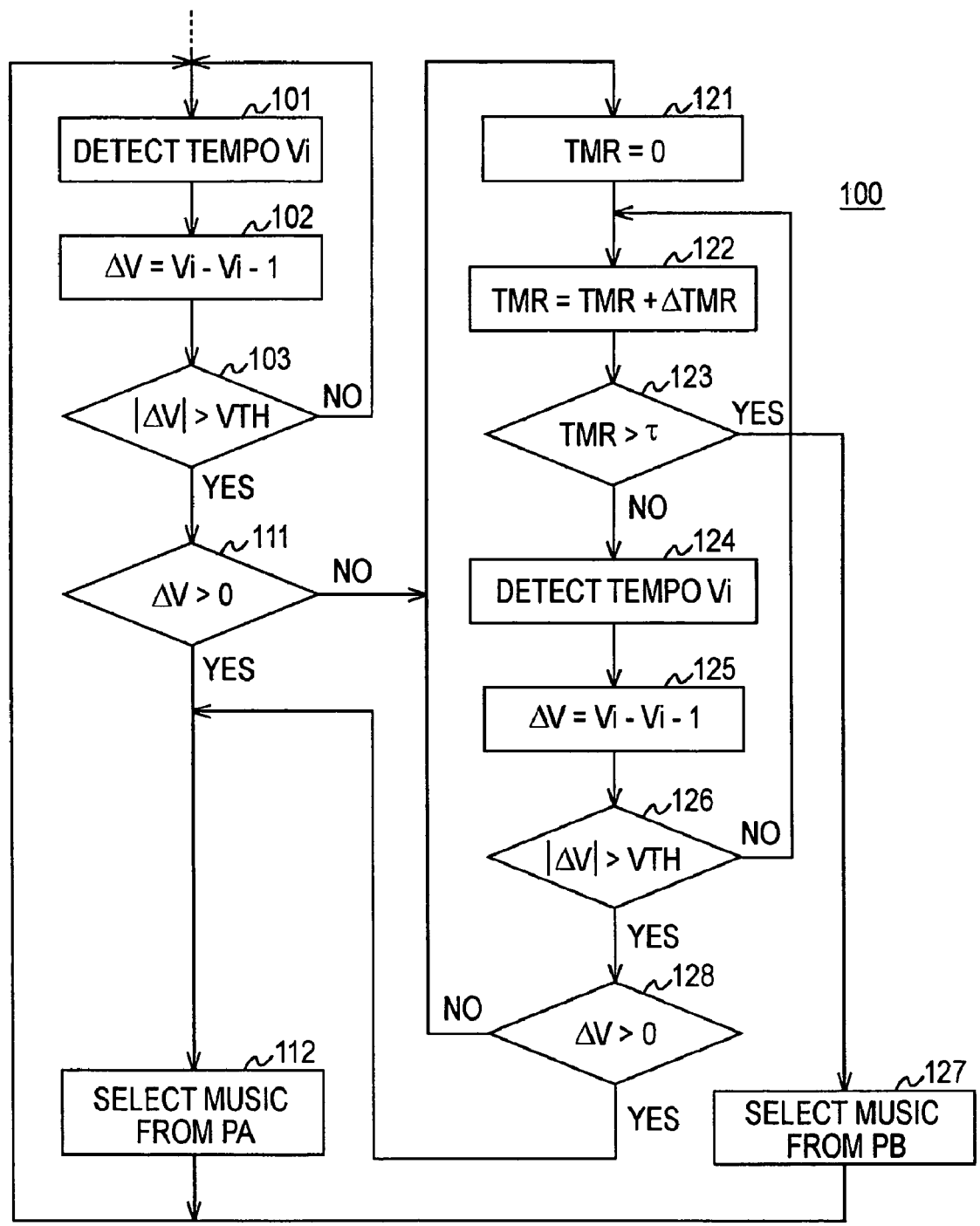
FIG. 5 is a flowchart illustrating an embodiment of the present invention.

Referring now to FIG. 5, a routine 100 performed by the reproducing apparatus 10 for implementing the processing illustrated using FIG. 3 is illustrated. This routine 100 is stored in the ROM 22 and executed by the CPU 21. At STEP 101, a walking tempo Vi of a user is detected by the detecting unit 40. Then, at STEP 102, a difference between the walking tempo Vi detected in STEP 101 and a walking tempo detected at a previous time point, i.e., the change in walking tempo $\Delta V$ ($\Delta V = Vi - (Vi-1)$), is calculated.

At STEP 103, the absolute value of $\Delta V$ calculated in STEP 102 is compared with a predetermined threshold value VTH (for example, the maximum value VTH of variation in walking tempo). If $|\Delta V| \leq VTH$, it is assumed that the value $\Delta V$ has been changed due to variation in walking tempo, and the routine returns to STEP 101.

On the other hand, if $|\Delta V| > VTH$ in STEP 103, it is assumed that the user has intentionally changed his or her walking tempo and the routine proceeds to STEP 111. At STEP 111, it is determined whether the $\Delta V$ is positive or negative. If $\Delta V > 0$, it is indicated that the walking tempo has become faster, as in the beginning of the period T1 and the period T3, and the routine proceeds to STEP 112.

At STEP 112, a music title corresponding to the current walking tempo Vi (in this case, any one of the music title A1 to Aa in the playlist PA) is selected. The music data corresponding to the selected music title is read from the storage unit 31 and fed to the reproducing circuit 34. Then, the routine returns to STEP 101. At the time when the walking tempo changes from a stop state or the slow tempo VB to the normal tempo VA, a music piece corresponding to the tempo VA starts being reproduced.

On the other hand, if $\Delta V \leq 0$, in STEP 111, it is indicated that the walking tempo has become slower, as in the beginning of the period T2, and routine proceeds to STEP 121. At STEP 121, a timer TMR for checking the period t is set to 0. At STEP 122, the timer is incremented by a predetermined amount $\Delta TMR$, and then compared with the value t, at STEP 123. If $\Delta TMR \leq t$, indicating that the period t has not elapsed, the routine proceeds to STEP 124.

At STEP 124, the current walking tempo Vi of the user is detected. Then, at STEP 125, the change $\Delta V$ in the walking tempo is calculated from Vi detected in STEP 124 and a walking tempo (Vi-1) detected at a time point preceding to the detection in STEP 124.

Subsequently, at STEP 126, the absolute value of the change $\Delta V$ calculated in STEP 125 is compared with the maximum value VTH of variation in walking tempo. If $|\Delta V| \leq VTH$, it is indicated the change is caused by variation in walking tempo, and the routine returns to STEP 122. Thus, if the walking tempo is maintained at the slow tempo VB during the period t, the processing of STEP 122 to STEP 126 is repeated. During this repetition period, a music piece of the normal tempo VA is reproduced and the timer TMR is incremented at a predetermined rate.

When the walking tempo is maintained at the slow tempo VB and the value of the timer TMR has been incremented and become greater than t, i.e., the period t ends, the routine proceeds to STEP 127. At STEP 127, one of the music titles B1 to Bb is selected from the playlist PB. Then, the music data corresponding to the selected music title is read from the storage unit 31 and fed to the reproducing circuit 34. Then, the routine returns to STEP 101.

With this arrangement, the music piece of the slow tempo VB is reproduced when the predetermined period t has elapsed after the change of the walking tempo from the normal tempo VA to the slow tempo VB, as in the period T2.

On the other hand, if $|\Delta V| > VTH$ in STEP 126, the routine proceeds to STEP 128. At STEP 128, it is determined whether the value $\Delta V$ is positive or negative. If $\Delta V > 0$, indicating that the walking tempo has changed from the slow tempo VB to the normal tempo VA, and the routine proceeds to STEP 112. At STEP 112, one of the music titles A1 to Aa corresponding to the normal tempo VA is selected from the playlist PA.

Thus, as illustrated by the broken line in the diagram I in FIG. 3, when the walking tempo changes from the slow tempo VB to the normal tempo VA during the period t, reproduction of a music piece of the normal tempo VA is continued.

When $\Delta V < 0$, in STEP 128, it is indicated that the walking tempo has become slower than the slow tempo VB or the user has stopped walking. In this case, the routine returns to STEP 121.

If it is determined that the walking tempo Vi is substantially zero, i.e., the user has stopped walking, a music piece can be selected from the playlist PC, or a music piece can be selected regardless of the walking tempo, since there is no music piece whose tempo is zero.

Thus, according to this routine 100 described above, the music pieces and music tempos can be changed in accordance with the walking tempo of the user, as illustrated in FIG. 3.

[3-2] Example of Processing Routing (Part 2)

Figure 6:
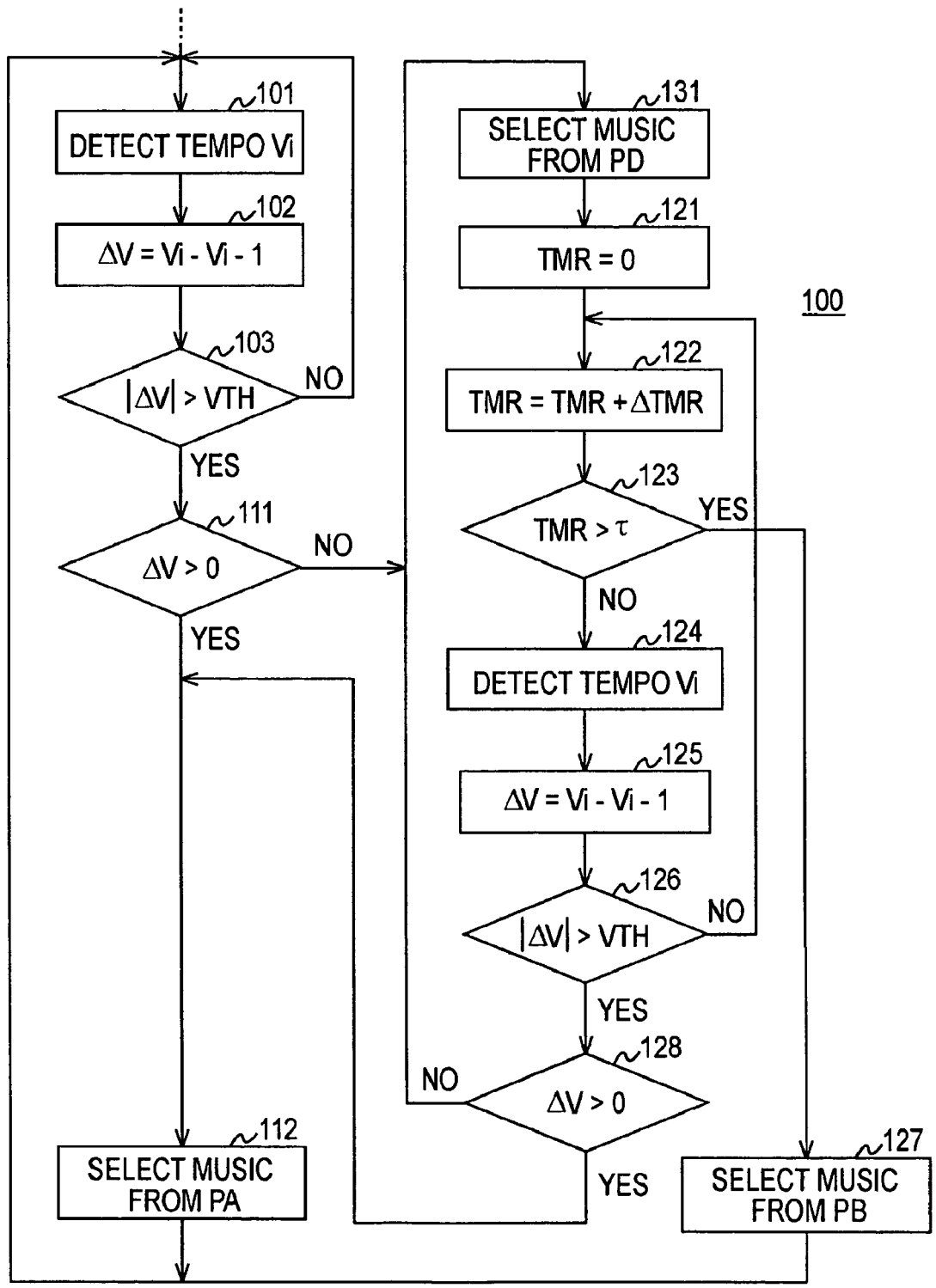
FIG. 6 is a flowchart illustrating an embodiment of the present invention.
Figure 7:
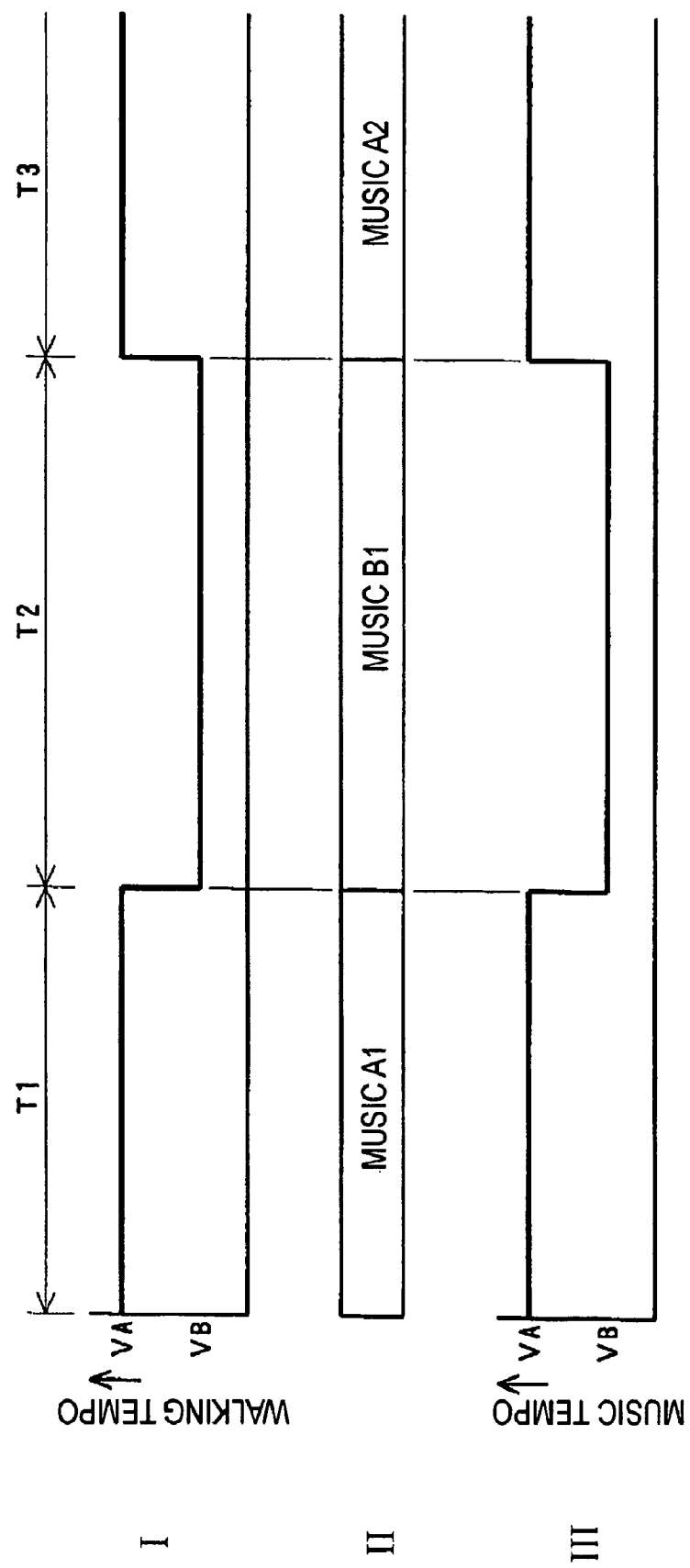
FIG. 7 illustrates an operation according to a known technique.

FIG. 6 illustrates a routine 100 performed by the reproducing apparatus 10 for implementing the processing described above with reference to FIG. 4. The routine 100 in this example includes processing of STEP 131 in addition to the routine 100 for described above with using in FIG. 3. Specifically, if $\Delta V < 0$ in STEP 111 (in the beginning of the period T2 in FIG. 4), the routine proceeds to STEP 131.

At STEP 131 one of the music titles D1 to Dd is selected from the playlist PD. Then, the music data corresponding to the selected music title is read from the storage unit 31 and fed to the reproducing circuit 34. Then, the routine proceeds to STEP 121. Thus, the music piece corresponding to the music title registered in the playlist PD is reproduced when the period t begins. Thereafter, the processing of STEP 121 to 126 is executed, similarly to the routine 100 illustrated in FIG. 5.

If the user maintains the slow walking tempo VB after the period t ends, the routine proceeds from STEP 123 to STEP 127. Thus, any one of the music pieces corresponding to the music titles registered in the playlist PB starts being reproduced at the end of the period t. When the walking tempo is changed before the period t ends so that $|\Delta V| > VTH$ is satisfied before the period t ends, the routine proceeds similarly to the case illustrated using FIG. 5.

As described above using FIG. 6, the music pieces and music tempos can be changed in accordance with the walking tempo of the user, according to the routine 100 illustrated in FIG. 6.

[4] Other Implementations

In the foregoing, the case is described in which when the walking tempo of a user changes to a relatively slow tempo, a music piece being reproduced is changed to another music piece of a different tempo with a delay of the predetermined period t. In contrast, however, it can also be configured that when the walking tempo is change to a relatively fast tempo, a music piece being reproduced changes to another music piece having a different tempo with a delay of the predetermined period t.

In addition, when the walking tempo Vi is detected in each of STEP 101 and STEP 124, the average walking tempo over several seconds can be obtained. With this arrangement, the influence of disturbance and an instantaneous change in the walking tempo can be reduced or become ignorable. The playlists PA to PD can also be stored in the storage unit 31. Moreover, the case is described above in which another tempo is applied in the period t as an intermediate tempo between the tempo VA and the tempo VB (i.e., the tempo VD), as illustrated using FIG. 4. However, a plurality of such intermediate tempos can also be applied.

Furthermore, in a case where the user walking at the tempo VA or the tempo VB stops walking, a period similar to the period t illustrated in FIG. 3 or FIG. 4 can be provided. In this case, the period starts at the time point when the user stops walking. During the period, a music piece of the tempo VB or a music piece whose tempo is slower than the tempo VB can be reproduced. It can also be configured such that silence is maintained during the period. Moreover, music pieces to be selected from each of the playlists PA and PB can be arranged so as to be reproduced in the order of the titles or at random. These music pieces can also be arranged so that one music piece is repeated. In addition, the user can designate music pieces to be reproduced.

The acceleration sensor 41 can be provided inside the reproducing apparatus 10. However, the acceleration sensor 41 can also be separated from the reproducing apparatus 10 and mounted on the headphone 52, for example. In this case, the detection signal of the acceleration sensor 41 can be sent to the analyzing circuit 42 through a wired or wireless connection. Specifically, a communication unit and the detecting means 40 are stored in a case separated from the storage unit 31, the reproducing circuit 34, the microcomputer 20, etc. Thus, using the communication unit, detection information of the detecting unit 40 can be sent to the microcomputer 20.

Instead of the acceleration sensor 41, a sensing device such as a velocity sensor, a pedometer, a gyro, and a GPS (Global Positioning System) can be employed. Further, the detecting unit 40 is not limited to being mounted on the body of a user. The detecting unit 40 can be carried in a pocket of the user's clothing or in the user's bag, as long as the unit can detect the walking tempo of the user.

It is also possible that music data is incorporated into digital video data. Further, as described in the foregoing, music data is changed to another when the amount of change in the walking tempo exceeds the threshold value VTH. This change can be validated or invalidated by setting of the user. In this case, the user can set an amount of the threshold value VTH. The user can also set a plurality of threshold values VTHs so as to appropriately apply each of the threshold values.

In the foregoing, the case is described in which the threshold value VTH is set using an absolute value of a walking tempo. However, it is also possible that the threshold value VTH is changed using an absolute value or set as a percentage of a walking tempo. Further, if a step with a predetermined weight is added to each of the procedure from STEP 101 to STEP 103 and the procedure from STEP 122 to STEP 126, a time interval for the change ΔV can be set to a desired value.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal reproducing apparatus comprising:
a storage unit to store digital audio data of music pieces;
a reproducing circuit to reproduce the digital audio data which has been selectively provided;
a detecting unit to detect at least one walking tempo of a user;
a calculating circuit to calculate a change in the walking tempo detected by the detecting unit; and
a control circuit to retrieve the digital audio data from the storage unit in accordance with the walking tempo detected by the detecting unit and sending the retrieved digital audio data to the reproducing circuit,
wherein the storage unit stores as the digital audio data,
digital audio data of music pieces each having a tempo corresponding to either a first tempo or a second tempo of walking of the user, the second tempo being different from the first tempo, and
digital audio data of a music piece having a tempo corresponding to a third tempo, the third tempo being intermediate between the first tempo and the second tempo, and
wherein the control circuit,
when the walking tempo of the user is the first tempo or the second tempo, retrieves the digital audio data of a music piece whose tempo corresponds to the first tempo or the second tempo, respectively, and sends the retrieved digital audio data to the reproducing circuit,
when the walking tempo of the user changes from the first tempo to the second tempo and the change exceeds a predetermined threshold value, changes the digital audio data to be sent from the storage unit to the reproducing circuit, at the time point when the change in the walking tempo occurs, from the digital audio data of a music piece whose tempo corresponds to the first tempo to the digital audio data of a music piece whose tempo corresponds to the third tempo, so that the music piece whose tempo corresponds to the third tempo is sent from the storage unit to the reproducing circuit for a predetermined period,
when the predetermined time has elapsed, changes the audio data to be sent from the storage unit to the reproducing circuit, from the digital audio data of a music piece whose tempo corresponds to the third tempo to the digital audio data of a music piece whose tempo corresponds to the second tempo,
when the walking tempo of the user changes from the second tempo to the first tempo and the change exceeds a predetermined threshold value, changes the digital audio data to be sent from the storage unit to the reproducing circuit, at the time point when the change in the walking tempo occurs, from the digital audio data of a music piece whose tempo corresponds to the second tempo to the digital audio data of a music piece whose tempo corresponds to the first tempo, and
wherein the calculating circuit obtains the change from a change in a detection output of the detecting unit over a predetermined time period.

2. The audio signal reproducing apparatus of claim 1, wherein the second tempo is slower than the first tempo.

3. The audio signal reproducing apparatus of claim 1, wherein the detecting unit is mounted on the body, clothes, or carried belongings of the user.

4. The audio signal reproducing apparatus of claim 1, further comprising a communication unit, wherein
the communication unit and the detecting unit are housed separately from the storage unit, the reproducing circuit, and the control circuit, and
the detection information obtained in the detecting unit is sent to the control circuit using the communication unit.

5. The audio signal reproducing apparatus of claim 1, wherein the detecting unit, the storage unit, the reproducing circuit, and the control circuit are housed together.

6. The audio signal reproducing apparatus of claim 1, wherein the detecting unit comprises an acceleration sensor, a velocity sensor, a pedometer, a gyro, or a GPS (Global Positioning System).

7. The audio signal reproducing apparatus of claim 1, wherein digital video data is incorporated into the digital audio data of music pieces.

8. The audio signal reproducing apparatus of claim 1, wherein the control circuit allows the change of the digital audio data performed when the change in the walking tempo exceeds the threshold value to be invalidated by an operation by the user.

9. The audio signal reproducing apparatus of claim 1, wherein the threshold value is set by the user.

10. The audio signal reproducing apparatus of claim 1, wherein a plurality of the threshold values are set by the user.

11. The audio signal reproducing apparatus of claim 1, wherein the threshold value is determined on the basis of a percentage of the walking tempo.

12. The audio signal reproducing apparatus of claim 1, wherein the threshold value is determined on the basis of the absolute value of the walking tempo.

13. The audio signal reproducing apparatus of claim 11, wherein the threshold value changes in accordance with the absolute value.

14. The audio signal reproducing apparatus of claim 12, wherein the threshold value changes in accordance with the absolute value.

15. A method for reproducing an audio signal comprising:
detecting at least one walking tempo of a user;
calculating a change in the walking tempo of the user;
when the walking tempo of the user is a first tempo or a second tempo, the second tempo being different from the first tempo, retrieving from a storage digital audio data of a music piece whose tempo corresponds to the first tempo or the second tempo, respectively, and sending the retrieved digital audio data to a reproducing circuit;
when the walking tempo of the user changes from the first tempo to the second tempo and the change in the walking tempo exceeds a predetermined threshold value, changing the digital audio data to be sent from the storage unit to the reproducing circuit, after a predetermined time period has elapsed since the change in the walking tempo, from the digital audio data of a music piece whose tempo corresponds to the first tempo to the digital audio data of a music piece whose tempo corresponds to the second tempo; and
when the walking tempo of the user changes from the second tempo to the first tempo and the change in the walking tempo exceeds the predetermined threshold value, changing the digital audio data to be sent from the storage unit to the reproducing circuit, at the time point when the change in the walking tempo occurs, from the digital audio data of a music piece whose tempo corresponds to the second tempo to the digital audio data of a music piece whose tempo corresponds to the first tempo.

16. A method for reproducing an audio signal comprising:
detecting at least one walking tempo of a user;
calculating a change in the walking tempo of the user;
when the walking tempo of the user is a first tempo or a second tempo, retrieving from a storage digital audio data of a music piece whose tempo corresponds to the first tempo or the second tempo, respectively, and sends the retrieved digital audio data to a reproducing circuit;
when the walking tempo of the user changes from the first tempo to the second tempo and the change exceeds a predetermined threshold value, changes the digital audio data to be sent from the storage unit to the reproducing circuit, at the time point when the change in the walking tempo occurs, from the digital audio data of a music piece whose tempo corresponds to the first tempo to the digital audio data of a music piece whose tempo corresponds to a third tempo, the third tempo being intermediate between the first tempo and the second tempo, so that the music piece whose tempo corresponds to the third tempo is sent from the storage unit to the reproducing circuit for a predetermined period;
when the predetermined period has elapsed, changing the audio data to be sent from the storage unit to the reproducing circuit, from the digital audio data of a music piece whose tempo corresponds to the third tempo to the digital audio data of a music piece whose tempo corresponds to the second tempo; and
when the walking tempo of the user changes from the second tempo to the first tempo and the change exceeds a predetermined threshold value, changing the digital audio data to be sent from the storage unit to the reproducing circuit, at the time point when the change in the walking tempo occurs, from the digital audio data of a music piece whose tempo corresponds to the second tempo to the digital audio data of a music piece whose tempo corresponds to the first tempo.

\* \* \* \* \*